UNITED STATES PATENT OFFICE.

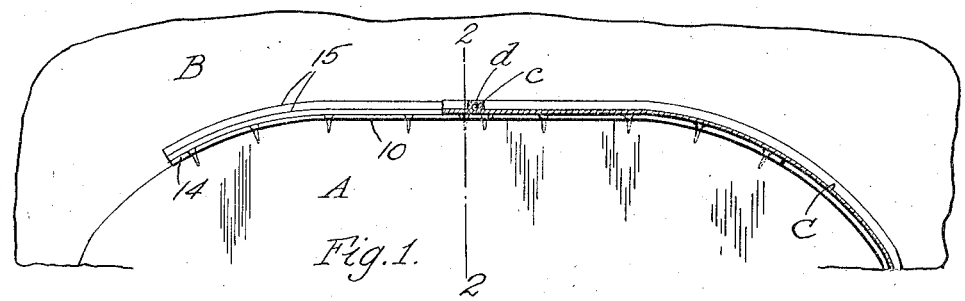
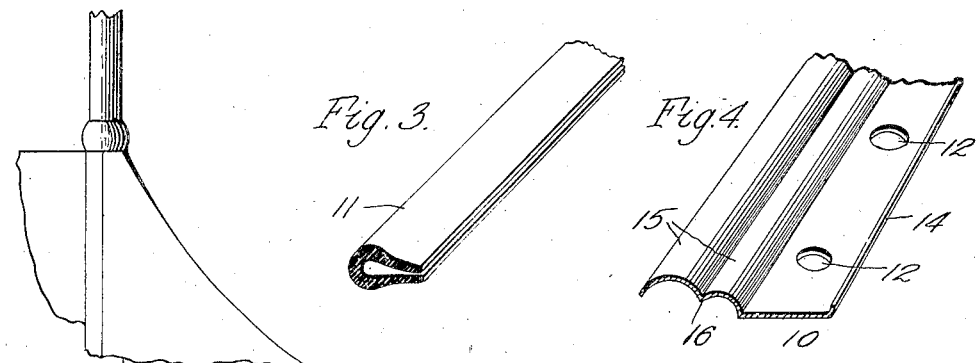
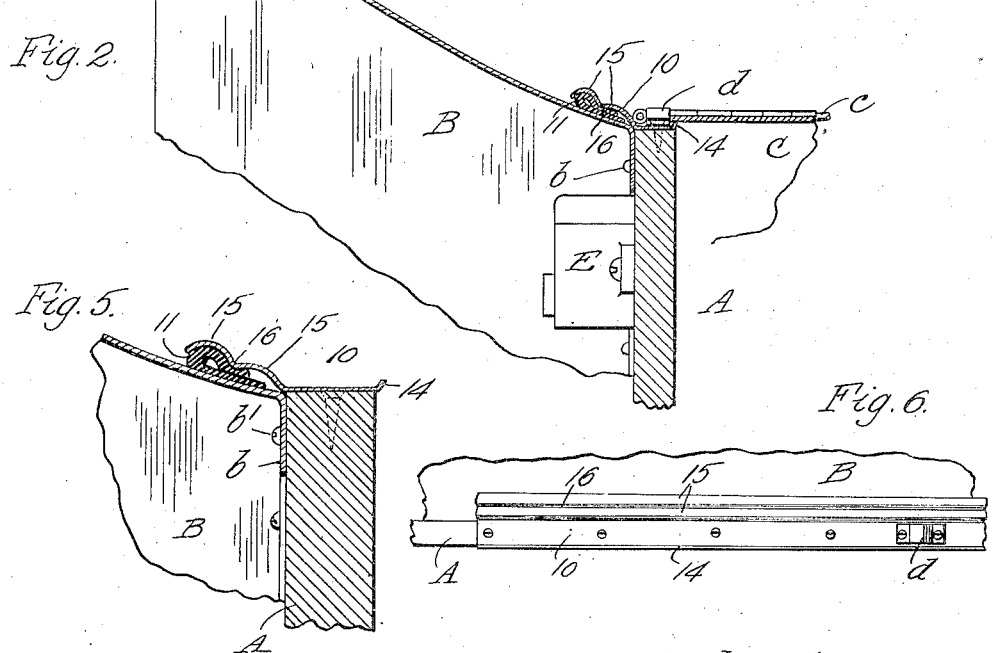

JOHN R. OISHEI, OF BUFFALO, NEW YORK.

PROTECTING APPLIANCE FOR USE ON AUTOMOBILES.

1,400,623. Specification of Letters Patent. Patented Dec. 20, 1921.

Application filed January 30, 1920. Serial No. 355,252.

*To all whom it may concern:*

Be it known that I, JOHN R. OISHEI, a citizen of the United States, residing at Buffalo, in the county of Erie and State of New York, have invented a new and useful Improvement in Protecting Appliances for Use on Automobiles, of which the following is a specification.

This invention relates to a coil protector or appliance for use on automobiles for preventing rain or water from running through the joints between the dash board and the cowl or engine hood and wetting or short circuiting the induction coil, electrical conductors or other adjacent parts of the automobile which should be protected from moisture.

Some automobiles are provided with an upright dash or board between the motor and the cowl of the vehicle body, and the cowl, which is made of sheet metal, slopes downwardly and inwardly and is fastened at its front end to the edge portions of the dashboard, and the hood or cover which incloses the engine or motor, and is usually composed of hinged sections to afford access to the motor, is supported at its rear end upon the dash board with its rear edge surrounding and resting upon the upper and side edges of the dash board. Since the induction coil or other parts of the electrical system of the automobile are usually mounted on or adjacent to the dash board beneath the cowl or the engine hood, any rain or water leaking through the joints between the hood or the cowl and the dash board is apt to wet said coil or parts and cause much annoyance and difficulty in the operation of the vehicle.

The primary object of this invention is to provide a protector or appliance which can be readily applied to automobiles and will effectually close the joint between the cowl and the dash board and prevent water or rain from running through this joint or into the space inclosed by the engine hood so as to protect the coil and other parts from moisture and prevent the difficulties mentioned. Another object is to provide a protector or joint closing device for the purpose stated which is of simple and inexpensive construction and which can be readily applied to an automobile by an inexperienced person with the aid of simple tools.

In the accompanying drawings:

Figure 1 is a fragmentary front elevation partly in section of a portion of the cowl, dash board and hood of an automobile provided with protecting means embodying the invention.

Fig. 2 is a fragmentary longitudinal sectional elevation thereof on an enlarged scale, on line 2—2 Fig. 1.

Fig. 3 is a perspective view of a portion of the rubber or yielding closure strip of the protector.

Fig. 4 is a similar view of a portion of the securing strip or member of the protector.

Fig. 5 is a full size fragmentary sectional elevation of a portion of the dash board, cowl and protector.

Fig. 6 is a fragmentary plan view thereof on a reduced scale.

A represents the upright dash board or wall between the body and engine of an automobile, B the cowl and C the hood or cover which incloses the engine or motor of the vehicle. These parts are of known construction. The dash board, which usually consists of an upright wooden board, has an upper edge which slopes or curves downwardly from its middle portion, or points at opposite sides thereof, to the upright side edges of the dash board. The cowl B is made of sheet metal and is pressed or formed to slope downwardly and inwardly from the front portion of the vehicle body so as to conform at its front end to the shape of the dash board, and the front edge $b$ of the cowl, which in the construction shown is bent inwardly, is fastened as by screws $b'$, to the rear face of the dash board adjacent the edge of the latter. The hood C as usual, consists of opposite sections which are hinged together at the top central portion of the hood by a hinge rod $c$, the rear end of which is removably seated in a bearing or loop $d$ secured centrally on the upper edge of the dash board. The rear edges of the sections of the hood project over or surround the upper and side edges of the dash board A. E indicates an induction coil or other part which may be mounted on or located adjacent the dash, and which it is desired to protect from moisture.

The protecting or joint closing device comprises a sheet metal strip or member 10 which is shaped to conform to the upper edge of the dash board and is adapted to be secured thereon, and a rubber or other yielding or elastic closure strip 11 which is adapted to be confined and compressed between the metal strip or member 10 and the outer surface of the cowl B. Different securing strips 10 intended for different makes of automobiles are made with slightly different curvatures or shapes and lengths as may be necessary to conform to the shape of and fit the dash boards of such different makes of automobiles. The securing member is provided at suitable points along its length with holes 12 through which screws or other fastenings may be driven into the edge of the dash board for securing the strip thereon, and the strip is usually provided midway between its ends with two holes properly spaced to receive the usual fastening screws for the loop or bearing $d$ for the rear end of the hinge rod of the hood. This loop is ordinarily secured by two screws on the upper edge of the dash board, and when applying the closure device the loop is removed, the closure device secured on the edge of the dash board, and the loop or bearing $d$ replaced on top of the securing strip 10 and secured by screws passing through the two middle holes of the securing strip. Preferably the front edge of the securing strip 10 is bent to form a narrow upwardly projecting flange or lip 14 and the rear portion of the strip is corrugated lengthwise to form two externally convexed beads or corrugations 15 and an intermediate inbent rib 16. This rear portion of the securing strip also inclines upwardly from the front or attaching portion of the strip so as to overhang the front portion of the cowl and conform more or less to the slope thereof. The rubber or yielding closure strip 11 is placed beneath the corrugated rear portion of the securing strip 10 and is pressed thereby firmly between the securing strip and the outer surface of the cowl. The rear edge of the securing strip which is bent downwardly, confines the yielding strip 11 under the securing strip and prevents the displacement of the closure strip, and the inbent rib 16 of the securing strip presses against the closure strip and compresses the same tightly against the cowl and insures a water tight joint between the closure device and the cowl which will prevent rain or water from running down the surface of the cowl and through the joint between the same and the dash board.

The yielding closure strip is preferably made of rubber in the substantially U-shaped or folded form shown in Fig. 3, the folded rear edge of this strip being thicker than the detached front edges of the strip. The corrugated or beaded formation of the rear portion of the metal securing strip stiffens this member lengthwise and prevents the member from bending out of its intended shape when fastening it on the dash. When, therefore, the securing strip or member is screwed tightly into place on the edge of the dash board, the ribbed rear portion thereof will press firmly down upon and compress the rubber or yielding closure strip 11 as indicated in Fig. 5, so as to insure a perfectly water tight joint around the edge of the dash board.

The upturned front edge or flange 14 of the metal strip forms a gutter along the top edge of the dash board and any rain or water which may run under the rear edge of the hood on top of the protecting device, is prevented from running down the front face of the dash or into the space within the hood, but is caused to run along the gutter formed by the flange 14 and flow downwardly at the side edges of the dash board where it can do no harm. The protecting device, therefore, prevents water from running down on either the front or rear face of the dash.

The protecting or closure device can be made of whatever length is necessary to properly protect underlying parts of the automobile and the device could, if desired, extend completely around the top and side edges of the dash board or from one to the other upright edges of the dash board, but this is not ordinarily necessary and the device can terminate, as indicated in the drawings, on the downwardly curved portions of the top edge of the dash board.

I claim as my invention:—

1. The combination with an automobile dash board, and a cowl fastened to the edge portion of the dash board, of a device for preventing the entrance of water through the joint between the dash board and the cowl, comprising a securing strip which conforms to the edge of the dash board and is secured thereon and overhangs the cowl, said strip having a longitudinal rib on its underside, and a yielding closure strip which is confined between said securing strip and the cowl and is pressed tightly against the surface of the cowl by said rib.

2. The combination with an automobile dash board having an edge with curved portions, and a cowl fastened to the edge portion of the dash board, of a device for preventing the entrance of water through the joint between the dash board and the cowl, comprising a securing strip which is bent to conform to the edge of said dash board and is secured thereon and overhangs the cowl, said strip having longitudinal bends which prevent deformation of the strip, and a yielding closure strip which is confined between said securing strip and the cowl and is pressed tightly against the surface of the cowl by said securing strip.

3. The combination with an automobile dash board and a cowl fastened thereto, of a device for preventing the entrance of water through the joint between said parts and the passage of water over the upper edge of said dash board, comprising a strip forming a gutter on said dash board edge and having a part overhanging said cowl, and a yielding closure strip which is pressed tightly against the surface of the cowl by said overhanging part.

4. The combination with an automobile dash board having an edge with curved portions, and a cowl fastened to the edge portion of the dash board, of a device for preventing the entrance of water through the joint between the dash board and the cowl, comprising a securing strip which is bent to conform to the edge of said dash board and is secured thereon and overhangs the cowl, said strip having longitudinal corrugations forming a confining groove and a rib on the underside of the strip, and a yielding closure strip which is confined between said securing strip and the cowl and is pressed tightly against the surface of the cowl by said rib.

5. The combination with an automobile dash board, and a cowl fastened to the edge portion of the dash board, of a device for preventing the entrance of water through the joint between the dash board and the cowl, comprising a securing strip which conforms to the edge of the dash board and is secured thereon and overhangs the cowl, said strip having a longitudinal groove in its underside, and a folded elastic closure strip which is pressed tightly against the surface of the cowl by said securing strip and is confined in said groove.

6. The combination with an automobile dash board and a cowl fastened thereto, of a device for preventing the entrance of water through the joint between said parts and the passage of water over the upper edge of said dash board, comprising a strip forming a gutter on said dash board edge and having a part overhanging said cowl, and formed with an inbent rib and a downwardly bent rear edge, and a U-shape yielding closure strip which is confined beneath said overhanging part and pressed tightly against the surface of the cowl by said inbent rib.

Witness my hand this 28th day of January, 1920.

JOHN R. OISHEI.

Witnesses:
CHARLES TESCHNER,
CHARLES W. GRADY.